United States Patent [19]

Beyerle et al.

[11] 3,855,224
[45] Dec. 17, 1974

[54] BASICALLY SUBSTITUTED (1H,3H)-QUINAZOLINE-2-THION-4-ONE DERIVATIVES

[75] Inventors: Rudi Beyerle, Bruchkobel, Germany; Adolf Stachel, deceased, late of Frankfurt-Fechenheim, Germany by Ingeburg Lydia Katharina Stachel, executrix; Rolf-Eberhard Nitz, Bergen-Enkheim; Josef Scholtholt, Frankfurt-Fechenheim, both of Germany

[73] Assignee: Cassella Farbwerke Mainkur Aktiengesellschaft, Frankfurt, Germany

[22] Filed: Apr. 17, 1973

[21] Appl. No.: 351,831

Related U.S. Application Data

[62] Division of Ser. No. 187,562, Oct. 7, 1971, Pat. No. 3,793,320.

[30] Foreign Application Priority Data

Oct. 15, 1970 Germany.......................... 2050640

[52] U.S. Cl......................................... 260/256.5 R
[51] Int. Cl............................................. C07d 51/48
[58] Field of Search.............. 260/256.5 R, 256.4 Q

[56] References Cited
UNITED STATES PATENTS

| | | | |
|---|---|---|---|
| 3,296,447 | 1/1967 | Papesch........................... | 260/256.4 |
| 3,712,892 | 1/1973 | Naba et al. .................. | 260/256.4 Q |
| 3,764,600 | 10/1973 | Ott............................... | 260/256.5 R |

*Primary Examiner*—Richard J. Gallagher
*Attorney, Agent, or Firm*—Francis M. Crawford

[57] ABSTRACT

The present invention relates to new pharmacologically valuable, basically substituted (1H,3H)-quinazoline-2-thion-4-one derivatives having the structural formula

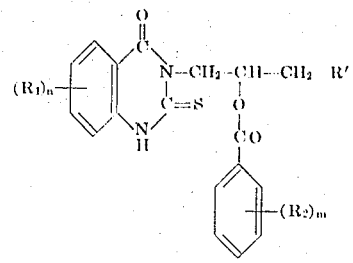

wherein
R' is a radical selected from the group consisting of N-alkyl-N-cycloalkylamino the alkyl moiety having 1-4 carbon atoms and the cycloalkyl moiety having 4-6 carbon atoms;
$R_1$ is an alkoxy group having 1-4 carbon atoms attached to positions 6,7 or 6,7,8;
$R_2$ is an alkoxy group having 1-4 carbon atoms;
$m$ is an integer selected from the group consisting of 1,2 and 3;
$n$ is an integer selected from the group consisting of 2 and 3;
or the pharmaceutically acceptable salts thereof, and to a process of producing said derivatives by acetylating, optionally in the presence of an acid-binding agent, (1H,3H)-quinazoline-2-thion-4-one derivatives having the structural formula

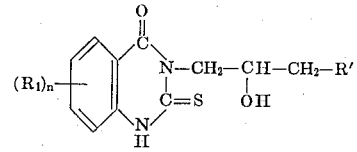

wherein R', $R_1$ and n have the above given meanings, with an alkoxy benzoic acid having the structural formula

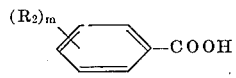

wherein $R_2$ and $m$ have the meanings set out hereinabove, or a functional derivative thereof.

4 Claims, No Drawings

BASICALLY SUBSTITUTED (1H,3H)-QUINAZOLINE-2-THION-4-ONE DERIVATIVES

The present application is a division of our U.S. patent application Ser. No. 187,562, filed Oct. 7, 1971, now matured into U.S. Pat. No. 3,793,320.

The present invention relates to new pharmacologically valuable, basically substituted (1H,3H)-quinazoline-2-thion-4-one derivatives having the structural formula

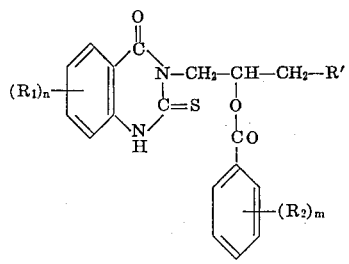

wherein
R' is

$R_1$ is an alkoxy group having 1–4 carbon atoms attached to positions 6,7 or 6,7,8;
$R_2$ is an alkoxy group having 1–4 carbon atoms;
$R_3$ is alkyl having 1–4 carbon atoms;
$R_4$ is cycloalkyl having 4–6 carbon atoms;
$m$ is an integer selected from the group consisting of 1,2 and 3;
$n$ is an integer selected from the group consisting of 2 and 3;
or the pharmaceutically acceptable salts thereof, and to a process of producing said derivatives by acetylating, optionally in the presence of an acid-binding agent, (1H,3H)-quinazoline-2-thion-4-one derivatives having the structural formula

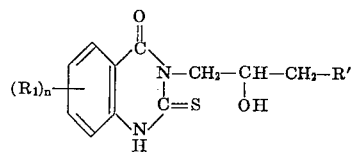

wherein R', $R_1$ and n have the above given meanings, with an alkoxy benzoic acid having the structural formula

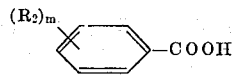

wherein $R_2$ and $m$ have the meanings set out hereinabove, or a functional derivative thereof.

The 3-(γ-amino-β-hydroxypropyl)-(1H,3H)-quinazoline-2-thion-4-ones required as starting material are prepared analogously to the description given in the Journal Helvetia Chimica Acta 50 (1967), 1,440, by reacting the correspondingly substituted o-alkoxycarbonyl-phenylisothiocyanates with 3-γ-amino-β-hydroxypropylamines.

The (1H,3H)-quinazoline-2-thion-4-one derivatives according to the present invention are valuable pharmaceuticals. In particular, They are excellent coronary dilators and, in this respect, superior to other known substances of this kind.

With respect to the change in the oxygen tension in the coronary veinous blood, the pharmacological investigation of the vasodilator action on the coronary vessels was carried out in dogs according to the methods described by W.K.A. Schaper and his co-workers (see W. K. A. Schaper, R. Xhonneux, and J. M. Bogaard "Ueber die kontinuierliche Messung des Sauerstoffdruckes im venoesen Coronarblut" (Naunyn Schmiedeberg's Arch. exp. Path. u. Pharmak. 245, 383–389 (1963)). The test preparations were applied intravenously to the narcotized and spontaneously breathing animals. On these test conditions the dilation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Luebbers type (see U. Gleichmann and D. W. Luebbers "Die Messung des Sauerstoffdruckes in Gasen und Flussigkeiten mit der Platin-Elektrode unter besonderer Beruecksichtigung der Messung im Blut," Pfluegers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmacological investigations which were carried through. The preparations were tested in the form of their respective hydrochlorides:

| Preparation | LD 50 g./kg. Mouse i.v. | Dosage mg./kg. i.v. | Maximal Increase in Oxygen Tension in the Coronary Veinous Blood in % | in Minutes | Maximal Change in the Heart Rate in % | in Minutes | Maximal Change in the Blood Pressure (systolic/diastolic) in % | in Minutes |
|---|---|---|---|---|---|---|---|---|
| 3-[γ-diethylamino-β-(3,4,5-trimethoxybenzoxy)-propyl]-6,7,8-trimethoxy-(1H,3H)-quinazoline-2-thion-4-one | | 0.05 | +77 | 30 | +16 | 20 | −7/−14 | 2 |

| Preparation | LD 50 g./kg. Mouse i.v. | Dosage mg./kg. i.v. | Maximal Increase in Oxygen Tension in the Coronary Veinous Blood | | Maximal Change in the Heart Rate | | Maximal Change in the Blood Pressure (systolic/diastolic) | |
|---|---|---|---|---|---|---|---|---|
| | | | in % | in Minutes | in % | in Minutes | in % | in Minutes |
| 3-[γ-di-n-propylamino-β-(3,4,5-trimethoxybenzoxy)-propyl]-6,7,8-trimethoxy-(1H,3H)-quinazoline-2-thion-4-one | | 0.05 | +46 | 50 | +25 | 10 | −5/±0 | 30 |
| 3-[γ-N-methyl-N-allylamino-β-(3,4,5-trimethoxybenzoxy)-propyl]-6,7,8-trimethoxy-(1H,3H)-quinazoline-2-thion-4-one | 0.15 | 0.05 | +75 | 55 | 0 | | −10/−12 | 55 |
| 3-[γ-N-methyl-N-benzylamino-β-(3,4,5-trimethoxybenzoxy)-propyl]-6,7,8-trimethoxy-(1H,3H)-quinazoline-2-thion-4-one | | 0.05 | +20 | 20 | +3 | 30 | 0 | |
| 3-[γ-N-ethyl-N-cyclohexyl-amino-β-(3,4,5-trimethoxybenzoxy)-propyl]-6,7,8-trimethoxy-(1H,3H)-quinazoline-2-thion-4-one | | 0.05 | +33 | 20 | ++30 | 20 | −5±0 | 3 |

| Preparation | LD 50 g./kg. Mouse i.v. | Dosage mg./kg. i.v. | Maximal Increase in Oxygen Tension in the Coronary Veinous Blood | | Maximal Change in the Heart Rate | | Maximal Change in the Blood Pressure (systolic/diastolic) | |
|---|---|---|---|---|---|---|---|---|
| | | | in % | in Minutes | in % | in Minutes | in % | in Minutes |
| 3-[γ-pyrrolidino-β-(3,4,5-trimethoxybenzoxy)-propyl]-6,7,8-trimethoxy-(1H,3H)-quinazoline-2-thion-4-one | | 0.05 | +33 | 45 | +10 | 20 | −11/±0 | 45 |
| 3-[γ-piperidino]β-(3,4,5-trimethoxybenzoxy)-propyl]-6,7,8-trimethoxy-(1H,3H)-quinazoline-2-thion-4-one | | 0.1 | +50 | 20 | +8 | 20 | 0 | |
| 3-[γ-morpholino-β-(3,4,5-trimethoxybenzoxy)-propyl]-6,7,8-trimethoxy-(1H,3H)-quinazoline-2-thion-4-one | | 0.05 | +110 | 50 | +14 | 45 | −15/−17 | 10 |
| 3-[γ-N'-(3,4-dimethoxybenzyl)-piperazino-β-(3,4,5-trimethoxybenzoxy)-propyl]-6,7,8-trimethoxy-(1H,3H)-quinazoline-2-thion-4-one | 0.155 | 0.1 | +65 | <45 | +5 | 45 | −12/−15 | 40 |
| 3-[γ-(N'-p-chlorophenyl-piperazino)-β-(3,4,5-trimethoxybenzoxy)-propyl]-6,7,8-trimethoxy-(1H,3H)-quinazoline-2-thion-one | | 1.0 | +24 | 30 | 0 | | 0 | |

| Preparation | LD 50 g./kg. Mouse i.v. | Dosage mg./kg. i.v. | Maximal Increase in Oxygen Tension in the Coronary Veinous Blood | | Maximal Change in the Heart Rate | | Maximal Change in the Blood Pressure (systolic/diastolic) | |
|---|---|---|---|---|---|---|---|---|
| | | | in % | in Minutes | in % | in Minutes | in % | in Minutes |
| 3-[γ-diethylamino-β-(3,4,5-trimethoxybenzoxy)-propyl]-6,7-dimethoxy-(1H,3H)-quinazoline-2-thion-4-one | 0.069 | 0.1 | +55 | 20 | +15 | 15 | −12/−20 | 5 |
| 3-[γ-morpholino-β-(3,4,5-trimethoxybenzoxy)-propyl]-6,7-dimethoxy-(1H,3H)-quinazoline-2-thion-4-one | <0.25 | 0.1 | +60 | 20 | +15 | 35 | −5/−15 | 5 |
| 3-[γ-hexamethylene-imino-β-(3,4,5-trimethoxybenzoxy)-propyl]-6,7,8-trimethoxy-(1H,3H)-quinazoline-2-thion-4-one | 0.16 | 1.0 | +130 | 45 | +20 | 45 | −15/−6 | 45 |

In the preparation of dragees and tablets containing as essential active ingredient the quinazoline derivatives of our invention these substances may be admixed with the conventional solid tabletting adjuvants, such as starch, lactose, talc and the like. Any of the tabletting materials and carriers customary in pharmaceutical practice may be employed.

For the preparation of the injection solutions the hydrochlorides of the quinazoline derivates are particularly suited since they have mostly a good water-solubility. Injection solutions of water-insoluble products may of course be prepared in the conventional manner by concurrently using well known suspending agents, emulsifiers and/or solubilizers.

For a better understanding of the nature and the objects of this invention, reference should be made to the accompanying example which is of an illustrative rather than a limiting nature. Unless otherwise stated, all temperatures given are in degrees Centigrade.

EXAMPLE 39.7 g. (0.1 mol) 3-(γ-diethylamino-β-hydroxypropyl)-6,7,8-trimethoxy-(1H,3H)-quinazoline-2-thion-4-one are dissolved in 250 c.c. chloroform and admixed with 11.1 g. (0.11 mol) triethylamine. Subsequently, while stirring at room temperature, a solution consisting of 25.3 g. (0.11 mol) 3,4,5-trimethoxybenzoyl chloride in 80 c.c. chloroform is added dropwise during 30 minutes and stirring is continued for one hour at room temperature. The reaction mixture is heated to the boil and stirred for 6 hours under reflux. After cooling down it is evaporated to dryness in vacuo. The residue is dissolved with stirring in dilute hydrochloric acid and the thusly obtained solution is filtered so as to become limpid. The aqueous hydrochloric acid solution is then rendered alkaline by the addition of aqueous sodium hydroxide solution and the oily, separating reaction product is dissolved in ethyl acetate. After drying over potassium carbonate, one obtains by the introduction of anhydrous gaseous hydrogen chloride into the ethyl acetate solution the hydrochloride of the 3-[γ-diethylamino-β-(3,4,5-trimethoxybenzoxy)-propyl]-6,7,8-trimethoxy-(1H,3H)-quinazoline-2-thion-4-one in the form of colorless needles melting at 154° – 156°.

Yield: 43 g. (= 68.5 percent of the theoretical).

The 3-(γ-diethylamino-β-hydroxypropyl)-6,7,8-trimethoxy-(1H,3H)-quinazoline-2-thion-4-one required as starting material may be prepared as follows:

28.3 g. (0.1 mol) 2,3,4-trimethoxy-6-methoxycarbonyl-phenylisothiocyanate, prepared by reacting analogously to the description given in "Journal of Organic Chemistry" 27 (1962), 3,702 the methyl-3,4,5-trimethoxy anthranilate with thiophosgene, are dissolved in 200 c.c. anhydrous diethyl ether and, while stirring at room temperature, admixed with a solution consiting of 14.6 g. (0.1 mol) γ-diethylamino--hydroxypropylamine in 60 c.c. anhydrous diethyl ether. Stirring is continued for 2 hours at room temperature, subsequently, the reaction product which separates in the form of crystals is sucked off and obtained is the 3-(γ-diethylamino-β-hydroxypropyl)-6,7,8-trimethoxy-(1H,3H)-quinazoline-2-thion-4-one in the form of colorless needles melting at 146°.

Yield: 33 g. (= 83 percent of the theoretical)

Analogously to the above process the following starting materials may be prepared:

General formula:

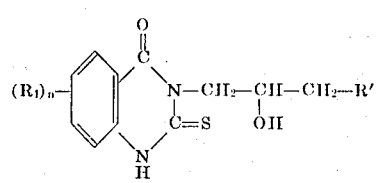

| $(R_1)_n$ | R' | M.P., degrees |
|---|---|---|
| 6,7-(OCH₃)₂ | —N(C₂H₅)₂ | 165-167 |
| 6,7-(OCH₃)₂ | —N⟩O (morpholino) | 211-212 |
| 6,7,8-(OCH₃)₃ | —N(n-C₃H₇)₂ | 153-155 |
| 6,7,8-(OCH₃)₃ | —N(CH₃)—CH₂—CH=CH₂ | 137-138 |
| 6,7,8-(OCH₃)₃ | —N(CH₃)CH₂C₆H₅ | 113-114 |
| 6,7,8-(OCH₃)₃ | —N(C₂H₅)—⟨H⟩ | 102-104 |
| 6,7,8-(OCH₃)₃ | —N⟩ (pyrrolidino) | 190 |
| 6,7,8-(OCH₃)₃ | —N⟩ (piperidino) | 189-191 |
| 6,7,8-(OCH₃)₃ | —N⟩O (morpholino) | 173 |
| 6,7,8-(OCH₃)₃ | —N⟩N—CH₂—⟨C₆H₃(OCH₃)₂⟩ | 157-159 |
| 6,7,8-(OCH₃)₃ | —N⟩N—⟨C₆H₄Cl⟩ | 218-221 |
| 6,7,8-(OCH₃)₃ | —N⟩ | 172 |

Analogously to the description given in para 1 of this example, the following compounds of the present invention are prepared from the above starting materials:

General formula:

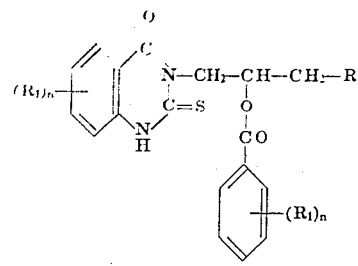

wherein
$R_1$ is an alkoxy group having 1 – 4 carbon atoms attached to positions 6,7 or 6,7,8;
$R_2$ is an alkoxy group having 1 – 4 carbon atoms;
$R_3$ is an alkyl group having 1 – 4 carbon atoms;

| $(R_2)_n$ | $(R_1)_n$ | R | M.P. (hydrochloride, degrees) |
|---|---|---|---|
| 3,4,5-$(OCH_3)_3$ | 6,7-$(OCH_3)_2$ | —$N(C_2H_5)_2$ | [1] 130 |
| 3,4,5-$(OCH_3)_3$ | 6,7-$(OCH_3)_2$ | —N⌒O | 156 |
| 3,4,5-$(OCH_3)_3$ | 6,7,8-$(OCH_3)_3$ | —$N(n-C_3H_7)_2$ | 119 |
| 3,4,5-$(OCH_3)_3$ | 6,7,8-$(OCH_3)_3$ | —$N(CH_3)CH_2$—CH=$CH_2$ | [1] 75 |
| 3,4,5-$(OCH_3)_3$ | 6,7,8-$(OCH_3)_3$ | —$N(CH_3)CH_2C_6H_5$ | 130 |
| 3,4,5-$(OCH_3)_3$ | 6,7,8-$(OCH_3)_3$ | —$N(C_2H_5)$—⟨H⟩ | 179 |
| 3,4,5-$(OCH_3)_3$ | 6,7,8-$(OCH_3)_3$ | —N⌒ (pyrrolidine) | 156–160 |
| 3,4,5-$(OCH_3)_3$ | 6,7,8-$(OCH_3)_3$ | —N⌒ (piperidine) | 203 |
| 3,4,5-$(OCH_3)_3$ | 6,7,8-$(OCH_3)_3$ | —N⌒O (morpholine) | 138–140 |
| 3,4,5-$(OCH_3)_3$ | 6,7,8-$(OCH_3)_3$ | —N⌒N—$CH_2$—⟨ph⟩—$OCH_3$/$OCH_3$ | 260 |
| 3,4,5-$(OCH_3)_3$ | 6,7,8-$(OCH_3)_3$ | —N⌒N—⟨ph⟩—Cl | 177–180 |
| 3,4,5-$(OCH_3)_3$ | 6,7,8-$(OCH_3)_3$ | —N⌒ (hexamethyleneimine) | 163 |

[1] Decomposition.

What is claimed is:
1. Basically substituted (1H,3H)-quinazoline-2-thion-4-one derivatives having the structural formula

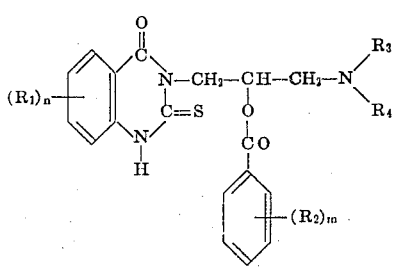

wherein
$R_1$ is an alkoxy group having 1 – 4 carbon atoms attached to positions 6,7 or 6,7,8;
$R_2$ is an alkoxy group having 1 – 4 carbon atoms;
$R_3$ is an alkyl group having 1 – 4 carbon atoms;
$R_4$ is a cycloalkyl group having 4 – 6 carbon atoms;
m is an integer selected from the group consisting of 1,2 and 3;
n is an integer selected from the group consisting of 2 and 3;
or the pharmaceutically acceptable salts thereof.

2. A compound according to claim 1, wherein $R_1$ is a methoxy group.

3. A compound according to claim 1, wherein $R_2$ is a methoxy group.

4. 3-[γ-N-Ethyl-N-cyclohexylamino-β-(3,4,5-trimethoxybenzoxy)-propyl]-6,7,8-trimethoxy-(1H,3H)-quinazoline-2-thion-4-one, or the pharmaceutically acceptable salts thereof.